United States Patent [19]

Lavender et al.

[11] 4,434,125
[45] Feb. 28, 1984

[54] METHOD FOR SECURING A WEAR SLEEVE ABOUT A DRILL PIPE

[75] Inventors: Gerry R. Lavender; James O. Chance, Jr., both of Houston, Tex.

[73] Assignee: Smith International, Inc., Newport Beach, Calif.

[21] Appl. No.: 357,782

[22] Filed: Mar. 12, 1982

[51] Int. Cl.³ ............................................... B29C 5/00
[52] U.S. Cl. .................................. 264/262; 249/105; 264/161; 264/272.13
[58] Field of Search .............. 264/262, 331.12, 272.13, 264/161, 102; 249/105

[56] References Cited

U.S. PATENT DOCUMENTS

| | | | |
|---|---|---|---|
| T869,009 | 12/1969 | Frank | 264/331.12 |
| 2,180,695 | 11/1939 | Rembert | 264/262 |
| 2,288,661 | 7/1942 | Wadman | 249/105 |
| 2,520,263 | 8/1950 | Vinal | 264/161 |
| 3,901,473 | 8/1975 | Braukmann et al. | 249/105 |
| 4,146,060 | 3/1979 | Garrett | 138/143 |
| 4,353,861 | 10/1982 | Caser | 264/236 |

Primary Examiner—Donald E. Czaja
Assistant Examiner—Mary A. Becker
Attorney, Agent, or Firm—Murray Robinson; Ned L. Conley; David A. Rose

[57] ABSTRACT

A wear sleeve having tapered ends is secured to a drill pipe by placing tapered split seal rings adjacent the ends of the sleeve to seal the annulus between the sleeve and pipe, introducing exothermically polymerically setting liquid epoxy plastics material into the annulus via a long elastomeric riser tube pushed into an inlet port in one seal ring until the epoxy rises well into another long elastomeric riser tube pushed into an exit port in the other seal ring, meanwhile heating the interior of the pipe within the sleeve to e.g. 150° F. by blowing hot air through the pipe, and when the plastics material has set, rotating the riser tubes about their axes to break off the sprues, and removing the riser tubes and seal rings.

15 Claims, 5 Drawing Figures

METHOD FOR SECURING A WEAR SLEEVE ABOUT A DRILL PIPE

BACKGROUND OF THE INVENTION

This invention relates to earth boring by the rotary system and more particularly to the securement of a wear sleeve about a length of drill pipe by means of an adhesive plastics material layer molded in situ between the sleeve and drill pipe tube.

Heretofore a variety of means and methods have been employed for the securement of a wear sleeve to a drill pipe tube, as described in some detail in U.S. Pat. Nos. 3,667,817—Kellner; 3,697,141—Garrett; 4,146,060—Garrett; 4,171,560—Garrett; and the references cited therein. One problem that arises in connection with the securement of a wear sleeve to a drill pipe tube by means of adhesive plastics material is the shrinkage of the plastics material as it cures or sets. Such shrinkage tends to leave voids in the plastics material layer between the sleeve and tube. Sometimes the plastics material layer pulls away from the tube or sleeve. This reduces the strength of the connection between the sleeve and tube and may impair the mechanical insulation between sleeve and tube afforded by the plastics material layer which serves to prevent overstressing of the tube.

It has been stated in U.S. Pat. No. 2,180,695—Rembert, that the annulus between a coupling and two adjacent pipe ends can be filled by pouring fluent material into a funnel feeding the annulus at one end and allowing displaced air to exit a funnel at the other end, enough fluent material being poured to rise in both funnels at the end of pouring, whereby on cooling and contracting of the filling material in the annulus additional fluent material may be drawn from the funnels to fill the annulus. This apparatus and procedure is employed however with a filling which is either melted to render it fluent and cooled to harden it, e.g. asphalt, petroleum still residue, high boiling plastic waxes and resins, lead, or sulfur based mixtures, or is initially a fluent mixture of solid particles and water which sets by hydration of the solids, i.e. Portland cement.

Thermoplastic materials that would soften at moderately high temperatures which may be encountered in the heat of the sun or the depths of a well would not be suitable for securing a wear sleeve to a drill pipe tube.

Lead has a melting point of 621 degrees F. For the attachment of wear sleeves to drill pipe tubes it would be of advantage to employ a filling that is fluent at room temperature.

Because of the axial stresses and shock loads imposed on such wear sleeves, Portland cement would not be suitable for securing a wear sleeve to a drill pipe tube.

Regardless of which of the materials proposed by Rembert is selected and despite the provision of inlet and outlet funnels, it will be observed that because all of the filling materials employed by Rembert solidify by cooling or hydration, the material in the funnels may solidify before the larger volume of material in the annulus, thereby preventing the supply of liquid material from the funnels to the annulus when the latter material solidifies and shrinks.

SUMMARY OF THE INVENTION

According to the present invention, the annulus between a drill pipe tube and a wear sleeve, closed at its ends by seal rings, is filled with liquid, low viscosity (e.g. 1200 cp), exothermically polymerically setting, epoxy cement at room temperature, via riser tubes at the ends of the annulus, the riser tubes providing a few inches of hydrostatic pressure for ensuring complete filling of the annulus and providing vents for discharge of air when the liquid has substantially filled the annulus, the liquid entering via a riser tube at one end of the annulus and driving air ahead of it out a riser tube at the other end of the annulus until the liquid appears in the exit riser tube, sufficient liquid being provided that liquid rises to a height of the order of a foot in the exit tube. During filling, the interior of the drill pipe tube is preferably at a temperature of about 150 degrees F., heat being applied internally, e.g. from an electric hot air blower at one end of the drill pipe tube. The internal heat provided by the blower, plus the heat generated by the epoxy itself as it sets exothermically, raises the larger mass of material in the annulus to a higher temperature than that in the riser tubes, so that the latter remains liquid while the former is setting into a high tenacity, elastic, cross linked polymer, whereby the inlet ports to the annulus remain open and the hydrostatic pressure of the liquid in the risers causes the flow of more liquid epoxy into the annulus as the set epoxy cures and shrinks, thereby preventing formation of voids and insuring adhesion to the metal surfaces of the drill pipe tube and wear sleeve.

BRIEF DESCRIPTION OF THE DRAWINGS

For a detailed description of a preferred embodiment of the invention, reference will be made to the accompanying drawings wherein.

The drawings are substantially to scale and the conventions of the U.S. Patent and Trademark Office for patent cases are employed to indicate materials, from which it will be seen that the parts preferably are all made of metal, i.e. steel, except that the riser tubes are made of elastomeric material, the two O-rings preferably are made of sealant material stable at the expected temperature, such as rubber or other elastomer or polytetra-fluorethylene, the adhesive layer is preferably epoxy, and the wear bands around the exterior of the wear sleeve are preferably made of tungsten carbide.

DESCRIPTION OF PREFERRED EMBODIMENT

Wear Sleeve

Figure 1:
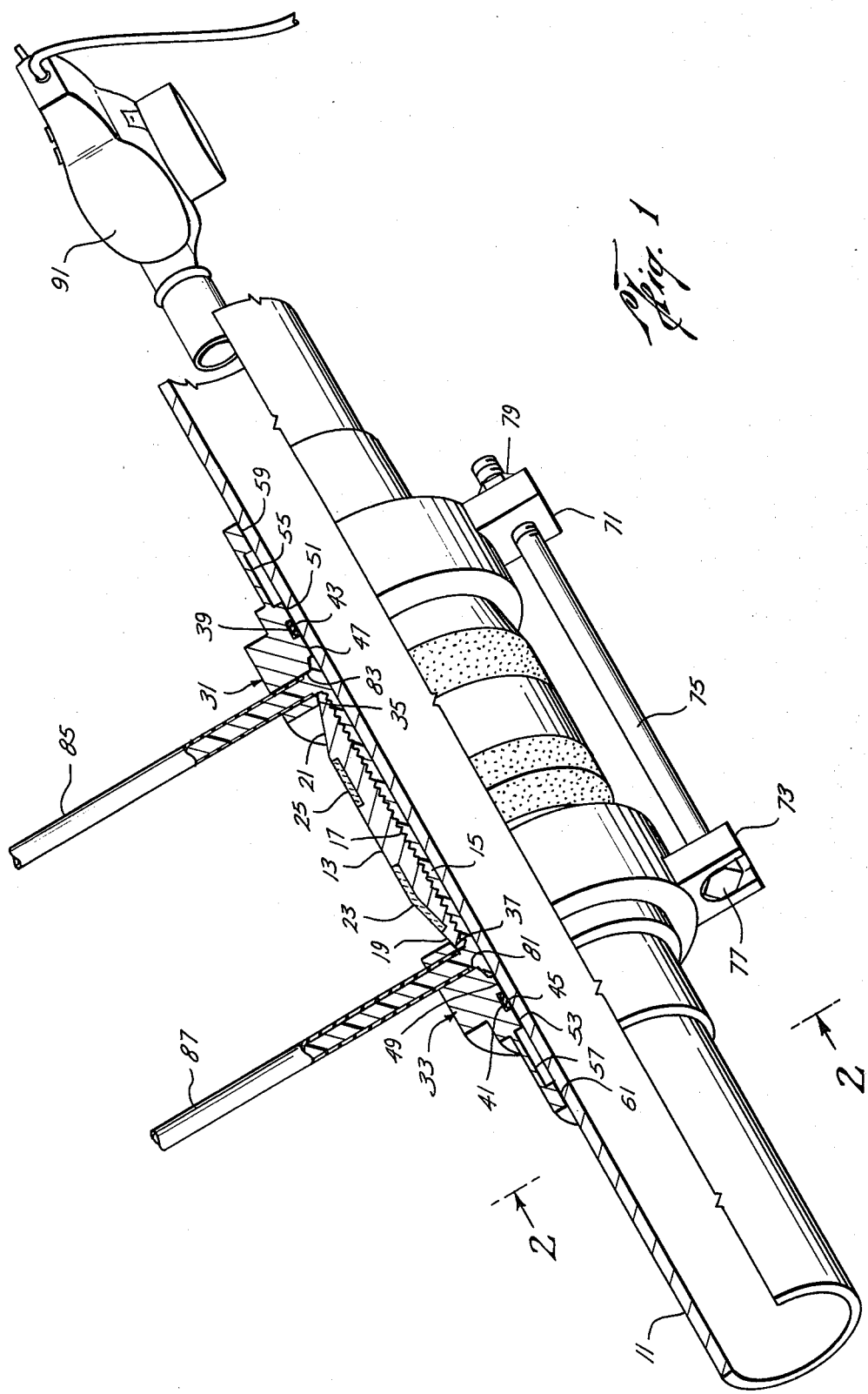
FIG. 1 is an elevation, partly in section, showing a wear sleeve about a drill pipe tube, with seal rings and riser tubes in position, illustrating the introduction to the annulus of exothermically setting adhesive thermoset plastics material, e.g. liquid epoxy.
Figure 5:
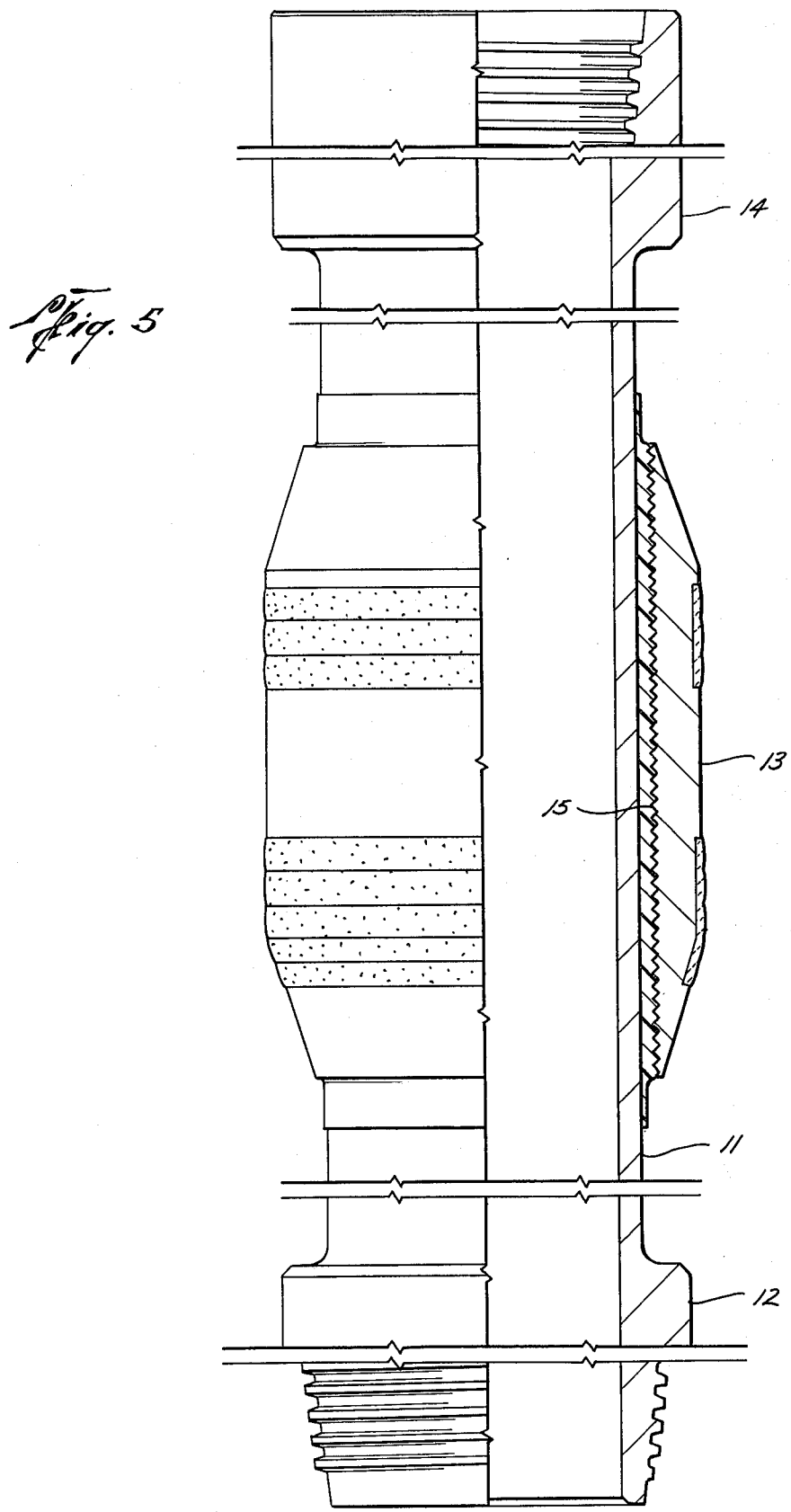
FIG. 5 is a half section showing the completed drill pipe.

Referring now to FIG. 1, there is shown an interiorly cylindrical and generally exteriorly cylindrical tubular wear sleeve 13 being attached by means of an annular layer 15 of epoxy. The inner periphery of the sleeve is serrated at 17 to provide mechanical engagement of the epoxy layer and wear sleeve. The outer periphery of the sleeve is conically tapered at its ends 19, 21, tapering down almost to an edge at "pin" end 19 and to a narrow rim at "box" end 21. When the pipe is run into a well bore the pin tool joint 12 (FIG. 5) will be at the lower end, and the box tool joint 14 will be at the upper end.

The "pin" end of the wear sleeve is thus its lower end and the "box" end is its upper end when the pipe is in a well bore, but when the sleeve is being installed as shown in FIG. 1, the drill pipe tube is horizontal. Wear bands 23, 25 of tungsten carbide are welded into grooves in the outer periphery of the sleeve, lower wear band 23 extending part way over the "pin" end 19. Sleeve 13 may be a homogeneously integral one piece sleeve as described in the aforementioned U.S. Pat. Nos. 4,146,060 and 4,171,560 to Garrett or it may be an initially multiple or two piece sleeve e.g. welded together in situ, as disclosed in the aforementioned U.S. Pat. Nos. 3,667,817 and 3,697,141 to Garrett and Kellner and in the contemporaneously filed U.S. patent application of William R. Garrett Ser. No. 357,783 filed Mar. 12, 1982.

Mold

Around the drill pipe tube at the ends of the wear sleeve are box and pin rings 31, 33. These rings are identical except for a slight inner diameter differences at the conically tapered end portions of the inner peripheries 35, 37 where they engage the slightly differing "box" and "pin" ends 21, 19 of the wear sleeve. The generally cylindrical mid portions of the inner peripheries of the rings include annular grooves 39, 41 in which are disposed O-rings 43, 45. The O rings have unstressed circular cross sections, which deform to elliptical cross-sections when in use. Between grooves 39,41 and tapered portions 35,37 respectively are cylindrical portions 47, 49 that are of larger diameter than tube 11 so that epoxy layer 15 extends beyond the ends of the wear sleeve. Beyond grooves 39, 41, the rings have cylindrical inner peripheral portions 51, 53 which fit closely about tube 11 to back up sealant material rings 43, 45. Separated from cylindrical portions 51, 53 by annular grooves 55, 57 are outrigger cylindrical portions 59, 61 which fit closely about tube 11 and help centralize and stabilize the rings on the tube so as to prevent canting and cocking of the rings relative to the tube axis, whereby when the rings are slid axially along tube 11 their conical portions 35, 37 will sealingly engage the correlative tapers on ends 21, 19 of the wear sleeve.

Figure 2:
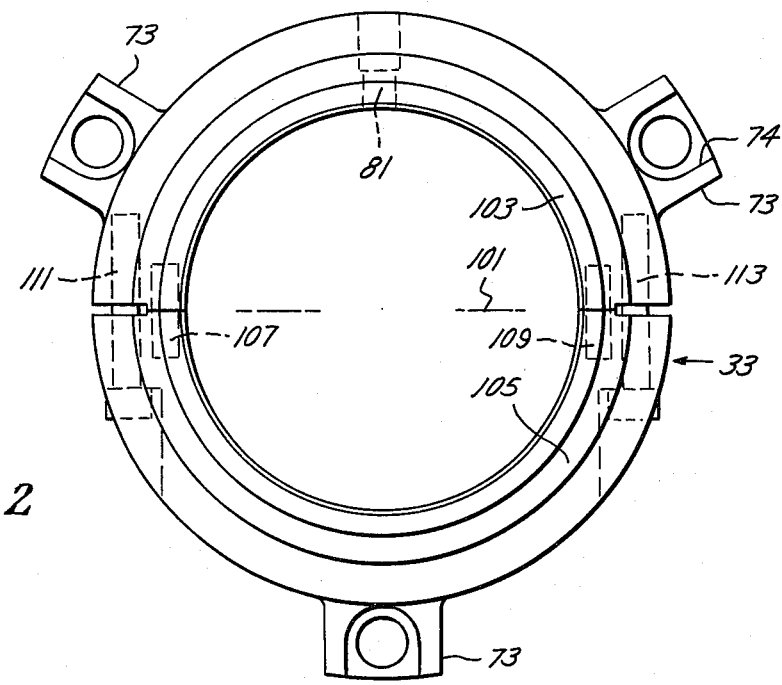
FIG. 2 is an end view of one of the seal rings.

Each ring 31, 33 is provied with three radial ears 71, 73 which, as shown in FIG. 2, are azimuthally spaced apart about the ring axis with 120 degress between centers. The ears are apertured as shown at 74, 76. Three bolts 75, each with its head 77 in one ear and a nut 79 adjacent the other ear, draw the rings together and in sealing engagement with the tapered ends of the wear sleeve.

Rings 31, 33, are provided with radial ports 81, 83 extending to epoxy layer 15 adjacent to, i.e. just beyond, the ends of wear sleeve 13. Elastomer riser tubes 85, 87 are pushed into these ports. The risers may have inner diameters approximately several times the approximately 0.150 inch thickness of epoxy layer 13, e.g. three-eighths of an inch, and their heights are preferably in excess of the outer diameter of layer 13, e.g. twice as great. This will provide both sufficient hydrostatic head to insure filling the entire annulus between drill pipe and wear sleeve as air is vented from the annulus and sufficient volume to satisfy the shrinkage of annular layer 15 as it cures without the need for excessively higher riser tubes.

The risers' inner diameter should be large enough to allow free flow and should be small enough to avoid premature curing. In this connection it is to be noted that if there is more than a critical mass of epoxy, e.g. the equivalent of a two inch deep body of liquid in a four inch diameter container (coffee can) it will heat up rapidly, e.g. in excess of 400 deg. F., causing the material to set in less than a minute, resulting in a less desirable product because of internal thermal stresses. On the other hand if the mass is too small the cooling may be so great relative to the heating that no substantial temperature rise occurs and it may be days before the material sets. Both the mass of epoxy in epoxy layer 15 and in riser tubes 85, 87 are less than the critical mass, and the mass in layer 15 is great enough, in conjunction with the additional heating by the blower, to effect a cure within a reasonable time.

Heater

Adjacent one end of tube 11 is directed the hot air from an electric hot air blower 91, which may be similar to a conventional hair dryer.

Split Mold

Figure 4:
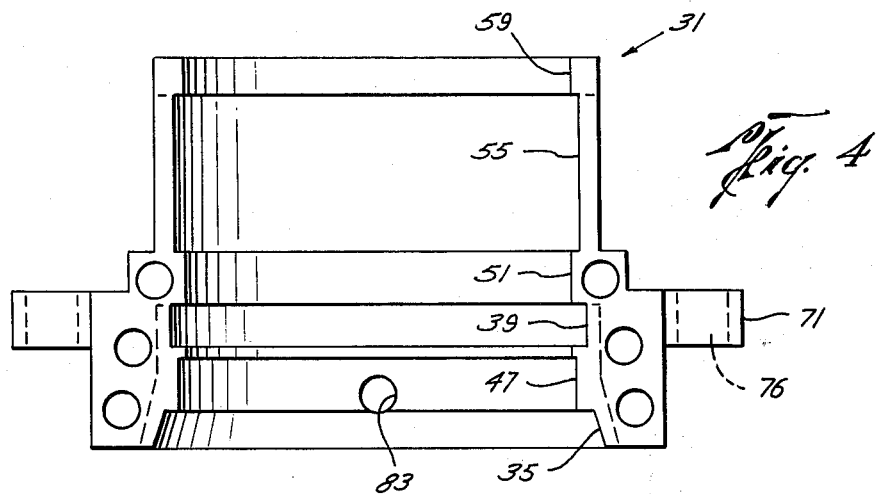
FIGS. 3 and 4 are axial sections through the pin and box end seal rings respectively.
Figure 3:
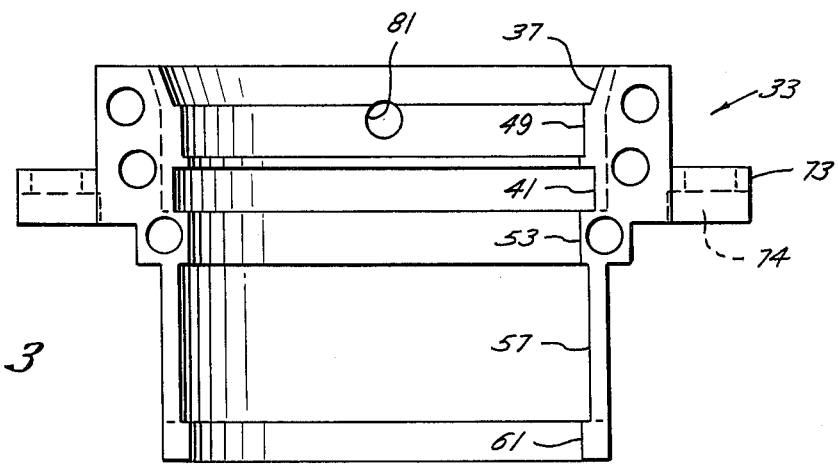

Referring now to FIGS. 2–4, each of seal rings 31, 33, e.g. ring 33 shown in FIG. 2, is preferably split diametrically along a horizontal plane 101, dividing the ring into upper and lower halves 103, 105. The halves are aligned by a dowel pin 107, 109 at each side and fastened together by pairs of screws 111, 113 at each side (only one screw of each pair appears in FIG. 2). Splitting the seal rings enables the rings to be positioned without passing over the ends of the drill pipe tube, which may not be possible in the case of pipe to which radially protuberant pin and box tool joints (FIG. 5) have been attached and which would in any event be somewhat difficult because of the need axially to slide the sealing material rings along the rough outer periphery of the drill pipe tube. It may here be noted that the O-rings 43, 46 may also be split diametrally in horizontal plane 111, or alternatively they may be one piece rings expanded to pass over the tool joints. For example, each O-ring may be expanded onto a support sleeve large enough to pass over a tool joint, the support sleeve moved down the pipe to adjacent the wear sleeve, and the O-ring rolled off the support sleeve onto the pipe. Then the split seal rings would be positioned around the O-rings.

Molding Procedure

With the apparatus in position as shown in FIG. 1, liquid (uncured) epoxy is poured into one of the riser tubes 87, 89 until epoxy appears in the other riser at a height of, e.g. at least a height equal to the outer diameter of layer 15, while heat preferably is applied by blower 91 to speed the cure of the self curing exothermic liquid epoxy. The material is allowed to cure. The cure proceeds from the inside out so as not to cure over the inlets, the hydrostatic head of uncured epoxy in the risers flowing epoxy to layer 15 as the latter shrinks in curing. The gravity feed allows air and gas to escape through both risers. After layer 15 is set, the seal rings 31, 33 are removed. Because of the interlock effected by the set epoxy sprues in the risers, it will be necessary to break off the sprues. This is done by rotating the riser tubes slightly. The tubes are then pulled out of the seal rings and discarded. The seal rings are then unbolted and hammered away from the wear sleeve and removed from the drill pipe.

The liquid fed to layer 15 through the risers is initially at room temperature. It is fed to the risers by pouring it into a funnel or cup connected by a hose to one of the risers. The mold is heated to about 150 deg. F. by the hot air blower. The blower end of the drill pipe tube may be wrapped with thermal insulation from the blower to the wear sleeve. A coupling may be employed between the end of the blower and the pipe. The mold, i.e. the tube, sleeve, and seal rings, is heated at the same time the epoxy is poured so that the epoxy will cure faster. The riser tubes may be at least 18 inches high, i.e. of the order of a foot more or less, which is at least two or three times the outer diameter of the epoxy layer 15. Longer tubes avoid the possibility of spillage during filling and the extra hydrostatic height insures proper filling of the annulus.

Epoxy Material

The liquid admitted to risers 85, 87 to form annular layer 15 is preferably a mixture of a low viscosity epoxy resin and a suitable hardener. Epoxy resin is a mixture of diglycidal ether of bisphenol A and higher molecular weight homologs, which may be diluted with any desired vehicle to achieve a desired low viscosity, e.g. 1200 centipoise at room temperature. The hardener preferably is an amine which reacts with the epoxy groups of the resin, causing an exothermic chemical reaction in the mixture, which transforms into a tough, insoluble, infusible, i.e. thermoset, solid. A suitable hardener is diethylene triamine. A suitable epoxy resin mixture is one having an epoxide equivalent weight of 177 to 188 and a viscosity (prior to mixture with the hardener) of 7000 to 10000 centipoise at 25 deg. C. Such resin and hardener are available from The Dow Chemical Company under the tradenames DER-330 and DEH-20 respectively and are described in Dow's brochure entitled Dow Liquid Epoxy Resins, copyright 1966, 1969, 1972 by The Dow Chemical Company. That brochure is incorporated herein by reference. Other resins and hardeners, e.g. others mentioned in the brochure, may be employed.

A suitable mixture is eleven parts by weight of hardener to one hundred parts by weight of resin, which is approximately a ten to one ratio of resin to hardener.

Although the above referred to Dow epoxy resin and hardener are preferred, any suitable exothermically self curing resin mixture resulting in an adhesive high strength tough infusible layer may be employed.

While a preferred embodiment of the invention has been shown and described, modifications can be made by one skilled in the art without departing from the spirit of the invention.

We claim:

1. Method of securing a metallic wear sleeve about a metallic drill pipe tube comprising:

positioning the sleeve concentrically about the tube forming an annulus therebetween, sealing the ends of the annulus, filling the annulus with liquid exothermically polymerically setting adhesive plastics material, which is at ambient room temperature when introduced, and allowing the plastics material to heat up and set gradually from the interior to the exterior of the annulus while introducing additional cooler liquid adhesive plastics material to the annulus to make up for setting shrinkage of the thermoset plastics material already in the annulus.

2. Method of fastening a metallic wear sleeve to a metallic drill pipe tube comprising:

disposing the wear sleeve concentrically about the tube in radially spaced relationship forming an annulus therebetween, placing a pair of seal rings about the tube, one ring at each end of the sleeve, said sleeve having beveled ends, each seal ring having a tapered end sealingly engaging the adjacent bevel on the sleeve, each seal ring having an O-ring disposed in an annular groove in its inner periphery sealingly engaged with the outer periphery of the tube, holding the tapered ends of said seal rings in engagement with said beveled ends of the wear sleeve, each seal ring having a flow port, each flow port communicating the annulus between the wear sleeve and drill pipe tube with the outer periphery of the ring, disposing the tube with its axis extending generally horizontally and the seal rings with said flow ports at their upper sides, placing an entrance riser tube in one port, and an exit riser tube in the other port, placing a fluent exothermically setting adhesive material into the entrance riser tube to feed gravitationally into the annulus between the sleeve and drill pipe tube while venting the annulus through the exit riser tube until the adhesive material rises in the exit riser tube to a level above the port in which the exit riser tube is disposed, maintaining a hydrostatic head of adhesive material at each flow port until the material in the annulus is set, and causing the adhesive material in the annulus to be at a higher temperature than that in the riser tubes in such a fashion that the temperature is highest at the inner periphery of the annulus gradually decreasing towards the outer periphery of the annulus so that the material at the inner periphery of the annulus cures faster than the material at the outer periphery of the annulus, whereby the flow ports to the annulus remain open and the hydrostatic pressure of the liquid in the risers causes the flow of more adhesive material into the portions of the annulus where the adhesive material already there sets and shrinks, thereby preventing formation of voids and insuring adhesion of the material to the metal surfaces of the drill pipe tube and wear sleeve.

3. Method according to claim 2, the adhesive material sprues which interlock the seal rings and the adhesive material in the annulus after the adhesive material has set being broken off by rotating the riser tubes about their axes, thereby freeing the seal rings which are then forced off the sleeve.

4. Method of claim 2 in which the adhesive material is at ambient room temperature when introduced and including heating the interior of the tube during introduction of the adhesive material to the annulus.

5. Method of claim 4, said heat being added by moving gas hotter than ambient room temperature through the interior of said tube.

6. Method of claim 2 in which the interior of the tube adjacent the sleeve is at a temperature above room temperature of the order of 150 deg. F., during introduction and setting of the adhesive material.

7. Method of claim 2 including maintaining a hydrostatic pressure of the order of one foot on the adhesive material until it is set.

8. Method of claim 2,
the upper end of the entrance riser being at atmospheric pressure whereby the adhesive material has a hydrostatic pressure equal to the height of the riser at the location where it is introduced to the annulus and gas in the annulus is free to depart by rising through the riser.

9. Method of claim 5,
said annulus being vented of gas via both risers as said adhesive material cures.

10. Method of claim 2 in which the fluent material is a mixture of epoxy resin and hardener.

11. Method of claim 8 in which the epoxy resin is a mixture of diglycidal ether of bisphenol A and higher molecular weight homologs and
has an epoxy weight of 177 to 188 and a viscosity of 7000 to 10000 centipoise at 25 deg. C.,
the hardener is diethylene triamine, the resin the hardener ratio of the mixture is of the order of 10 to 1, and the mixture has a viscosity at room temperature (68–72 deg. F.) of the order of 1200 centipoise.

12. Method of claim 2 in which the adhesive material sets from the inside of the annulus adjacent the tube towards the outside of the annulus adjacent the sleeve and the adhesive material is introduced to an outer periphery of the annulus.

13. Method of claim 2 in which the material in the annulus sets progressing from the mid portion between the ends thereof towards the ends of the annulus and after the annulus is filled the adhesive material is introduced at both ends of the annulus during the setting of the material.

14. Method of securing a metallic wear sleeve about a metallic drill pipe comprising:
positioning the sleeve concentrically about the tube forming an annulus therebetween,
filling the annulus with liquid exothermically polymerically thermo-setting adhesive plastics material, which is at ambient room temperature when introduced,
allowing the plastics material in the annulus to rise in temperature due to its exothermic setting generating heat faster than heat is dissipated from the annulus through the surrounding walls defining the annulus including the metal pipe and sleeve in such a manner that the temperature of the material in the inner periphery of the annulus rises faster than the material in the outer periphery of the annulus, and
while the first introduced material initially filling the annulus is exothermically setting, introducing additional cooler liquid adhesive plastics material to the annulus to make up for setting shrinkage of the thermoset plastics material already in the annulus,
thereby preventing formation of voids and insuring adhesion of the material to the metal surfaces of the drill pipe tube and wear sleeve.

15. Method of claim 14 in which annulus is filled with an amount of exothermically setting plastics material less than the critical mass, and including:
heating the interior of the tube during introduction of the adhesive material to the annulus.

* * * * *

UNITED STATES PATENT AND TRADEMARK OFFICE
CERTIFICATE OF CORRECTION

PATENT NO. : 4,434,125
DATED : FEBRUARY 28, 1984
INVENTOR(S) : GERRY R. LAVENDER AND JAMES O. CHANCE, JR.

It is certified that error appears in the above—identified patent and that said Letters Patent is hereby corrected as shown below:

Column 3, line 43; change "provied" to
--provided--.

Column 4, line 35; change "43, 46" to
--43,45--.

Claim 11, line 6; change "the resin the" to
--the resin to--.

Signed and Sealed this

Twelfth Day of June 1984

[SEAL]

Attest:

GERALD J. MOSSINGHOFF

Attesting Officer

Commissioner of Patents and Trademarks